United States Patent
Kawai et al.

(10) Patent No.: US 6,283,861 B1
(45) Date of Patent: Sep. 4, 2001

(54) VIDEO GAME DEVICE AND VIDEO GAME METHOD

(75) Inventors: Hiroshi Kawai; Takayuki Niwa, both of Honolulu, HI (US)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/274,926

(22) Filed: Mar. 23, 1999

(51) Int. Cl.$^7$ ................................................ A63F 13/00
(52) U.S. Cl. ................................. 463/43; 463/8; 463/32
(58) Field of Search .................................. 463/30–34, 37, 463/43, 53–54, 1–2, 48–52, 55–57; 345/419, 421–427, 440–443, 113–116, 118, 126–127, 133, 135; 434/16–20; 446/23, 397–405, 473; 473/578

(56) References Cited

U.S. PATENT DOCUMENTS

| | | | | |
|---|---|---|---|---|
| 2,593,117 | * | 4/1952 | Davenport | 273/105.1 |
| 3,790,172 | * | 2/1974 | Nakamura | 273/101.2 |
| 4,455,024 | * | 6/1984 | Yanagawa | 273/85 G |
| 4,600,200 | * | 7/1986 | Oka et al. | 273/313 |
| 4,659,088 | * | 4/1987 | Lee et al. | 273/310 |
| 5,114,154 | * | 5/1992 | Sellner | 273/310 |
| 5,164,538 | * | 11/1992 | McClain, III | 102/517 |
| 5,551,876 | * | 9/1996 | Koresawa et al. | 434/16 |
| 5,846,147 | * | 12/1998 | Basik | 473/586 |
| 5,954,332 | * | 9/1999 | Mero et al. | 273/236 |
| 6,106,395 | * | 8/2000 | Begis | 463/23 |

OTHER PUBLICATIONS

Robert E. Waring, "Doom" Totally Unauthorized Tips & Secrets, Dec. 1994, USPTO Library, pp. 1–4, pp. 22–29, and pp. 32–57.*

* cited by examiner

*Primary Examiner*—Michael O'Neill
*Assistant Examiner*—Scott E. Jones
(74) *Attorney, Agent, or Firm*—Oblon, Spivak, McClelland, Maier & Neustadt, P.C.

(57) ABSTRACT

In a scene of a role-playing game in which the player character, whose actions are controlled by a player, fights with an enemy with one of a variety of items such as weapons, a video game device selects one item in accordance with a player's operation. The video game device obtains an effective range such as a shooting range which has been predetermined for the selected item, and displays this effective range as a hemispherical wire frame model or the like, positioning the center of the effective range at the position of the player character. The player judges the effectiveness of an attack from the displayed wire frame model. A hitting probability, the effect attained when the player attacks the enemy, such as a damage imparted on the enemy, differs depending on whether the enemy is located within the wire frame or not.

20 Claims, 15 Drawing Sheets

| PLAYER CHARACTER AND ENEMY / SHOOTING RANGE | HITTING PROBABILITY | DEGREE OF DAMAGE (% OF REFERENCE VALUE) |
|---|---|---|
| 0 – 50% | 100% | 100% |
| 51 – 80% | 100% | 100% |
| 81 – 100% | 100% | 100% |
| ------- WIRE FRAME ------- | | |
| 101 – 120% | 80% | 30% |
| 121 – 150% | 50% | 30% |
| 151 – 180% | 25% | 30% |
| 181 % | 0% | 0% |

FIG. 3

| ITEM | SHOOTING RANGE L | DAMAGE (REFERENCE VALUE) |
|---|---|---|
| PISTOL | 10 | 10 |
| BOW & ARROW | 6 | 5 |
| BOMB | 5 | 20 |
| FIRE | 2 | 5 |
| MAGIC | 20 | 7 |
| SUPERNATURAL POWER | 1 | 8 |

FIG. 4

| PLAYER CHARACTER AND ENEMY / SHOOTING RANGE | HITTING PROBABILITY | DEGREE OF DAMAGE (% OF REFERENCE VALUE) |
|---|---|---|
| 0 — 50% | 100% | 100% |
| 51 — 80% | 100% | 100% |
| 81 — 100% | 100% | 100% |
| -------- WIRE FRAME -------- | | |
| 101 — 120% | 80% | 30% |
| 121 — 150% | 50% | 30% |
| 151 — 180% | 25% | 30% |
| 181 % | 0% | 0% |

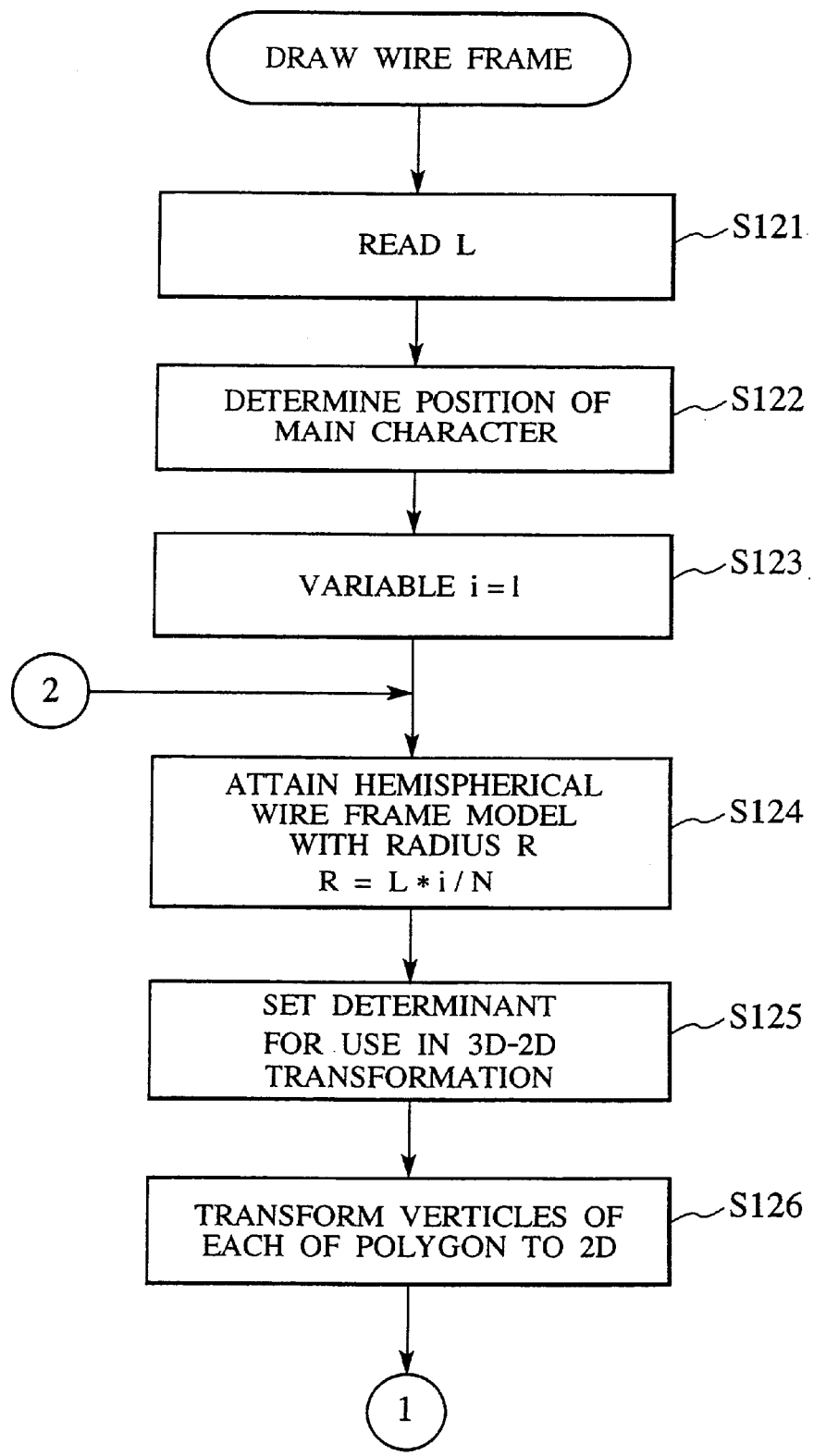

FIG. 11

| ENEMY CHARACTER | KIND OF WEAPON | NUMBER OF SHOTS | FIGHTING TIME (sec) | FIGHTING ABILITY |
|---|---|---|---|---|
| RAT | PISTOL | LESS THAN 5 | SHORTER THAN 15 | 3 |
| | | | 15 OR LONGER | 2 |
| | | 5 OR MORE | SHORTER THAN 15 | 2 |
| | | | 15 OR LONGER | 1 |
| | BOW & ARROW | LESS THAN 7 | SHORTER THAN 20 | 3 |
| | | | 20 OR LONGER | 2 |
| | | 7 OR MORE | SHORTER THAN 20 | 2 |
| | | | 20 OR LONGER | 1 |

VIDEO GAME DEVICE AND VIDEO GAME METHOD

BACKGROUND OF THE INVENTION

1. Field of the Invention

The present invention relates to a video game, and more particularly to a video game which can let a player visually know the effective ranges of various tools (items) for use in a game.

2. Description of the Related Art

At the initial stage of the popularization of video game machines, most video games were 2-Dimensional (2D) games in which the images of objects like game characters and buildings were displayed two-dimensionally. In recent years, however, most video games have become 3-Dimensional (3D) games in which the images of the objects are displayed three-dimensionally, due to improvements in the performances of image processors.

Of 3D games, role-playing games (RPGs) are especially popular because a player can experience the game story, while acting as if he were the player character (the main character).

In general, an element of character development has been introduced in RPGs. For example, an RPG is designed so that the player gains a predetermined experience level as a result of winning fights with enemy characters. To facilitate player character development, many fighting scenes are presented during the progress of the game in RPGs.

Generally speaking, in a fight in an RPG, the player character and an enemy character (non-player character) alternately attack each other, and the first character to cause the other's Hit Points (HP; life force) to be zero wins. There are two types of attacks: one is an attack by the player character itself and the other is an attack using items (which affect an opponent) such as weapons and magic.

In conventional video games, the effects of the items such as weapons and magic vary according to their kinds. However, little consideration is given to their effective ranges (such as the shooting ranges). Due to this, when attacking the enemy character using an arrow, for example, if the arrow flies toward the enemy character, then the arrow hits the enemy character in most cases, regardless of the distance between the characters.

Making the effects of the items different from each other depending on the distance between the attacking character and the opponent character has also been brought into practice. In conventional video games, however, since a player is not notified of the effective ranges of the items, he is not able to correctly judge whether an item which he intends to use will be effective to do damage to the enemy.

SUMMARY OF THE INVENTION

It is an object of the present invention to provide a video game which permits a player to recognize the effective ranges of items such as weapons and magic at the time when the player chooses an item for a battle with an enemy character.

According to the first aspect of the present invention, there is provided a video game device, which executes a game wherein a first character, whose actions are controlled by input instructions from a player, fights with a second character with an item, the device comprises:

effective range setting means for setting a three-dimensional effective range which has its center at a predetermined reference point and where the item to be used by the first character for fighting with the second character is effective;

three-dimensional image processing means for causing a display device to display a three-dimensional reference range corresponding to the effective range set by said effective range setting means;

attack instruction means for giving attack instructions to the first character; and attack result control means for causing the first character to attack the second character with the item in accordance with the instructions from said attack instruction means.

According to this structure, when the first character (normally the player character or main character), which is operated by the player, attacks the second character with an item such as a weapon, magic or supernatural power, a three-dimensional reference range which directly or indirectly represents the effective range (where an attack is effective; for example, the shooting range of a bow) of the item such as a weapon, is shown. Therefore, the player can recognize the effective range of the item at a glance from the three-dimensional reference range, and can appropriately determine the player's strategies, enhancing the reality of the game and making the game more entertaining.

When the item is a weapon, the reference range can be selected as desired in accordance with the effective range of the item. For example, a range in which the hitting probability is 100% or a range in which the hitting probability is higher than 0% can be selected as the reference range.

The three-dimensional image processing means can cause the display device to display the three-dimensional reference range, corresponding to the effective range set by the effective range setting means, in the form of a polyhedron defined by a wire frame. A display-processing load in the case of displaying the reference range in the form of a polyhedron defined by the wire frame is small, and accordingly does not cause a delay in the elemental processes required for the game.

It is preferred that, of polygons defining the wire frame, the three-dimensional image processing means draw sides of a foreground polygon in order that the sides will not overlap with sides of adjacent polygons, and draw a ground based side of a background polygon.

The three-dimensional image processing means can cause the display device to display the three-dimensional reference range corresponding to the effective range set by the effective range setting means in a substantially spherical form.

It is preferred that the three-dimensional image processing means cause the display device to display the three-dimensional reference range while gradually expanding the reference range. By gradually expanding the effective range while positioning its center at a reference point, the reality of the game is further enhanced.

This reference point is, for example, the position of the first character which attacks the second character.

For example, the item used to hit an enemy is a weapon such as a pistol, a bow, fire, etc. In this case, it is preferred that the attack result control means control the result of the attack so that the chance of hitting the second character in the case where the second character is located inside the reference range will be higher than in the case where the second character is outside the reference range. Similarly, it is also preferred that the attack result control means control the result of the attack so that the attack on the second character inside the reference range will damage to the second character more seriously than an attack on the second character outside the reference range.

The video game device may further comprise selection means by which the player selects an arbitrary item from a plurality of items, and the effective range setting means may set the effective range of the item selected by the selection means.

The video game device may further comprise storage means for storing effective ranges which have been predetermined one for each of the plurality of items, and the effective range setting means may set an effective range of a size according to the effective range of the item selected by the selection means.

According to the second aspect of the present invention, there is provided a video game device comprising:

an input device for inputting instructions; and a processing circuit for executing a game program for a game in which items are prepared, in accordance with the instructions input from said input device, and for executing the game in accordance with the instructions input from said input device and outputting an image signal representing images used in the game;

wherein the item is designated in accordance with the input instruction from said input device, and the processing circuit sets a three-dimensional reference range corresponding to an effective range of the designated item, and outputs, to a display device, an image signal representing the set three-dimensional reference range to be displayed on the display device.

According also to this structure, the three-dimensional reference range which directly or indirectly represents the effective range of the item is shown. Therefore, the player can recognize the effective range of the item at a glance from the displayed reference range, and can appropriately determine the player's strategies thereafter, enhancing the reality of the game and making the game more entertaining.

The processing circuit causes the display device to display the set three-dimensional reference range in the form of a polyhedron defined by a wire frame, for example. It is preferred that the wires forming the wire frame be semi-transparent lines. Furthermore, of polygons defining the wire frame, the processing circuit draws sides of a foreground polygon in order that the sides will not overlap with sides of adjacent polygons, and draws a ground based side of a background polygon.

The processing circuit may cause the display device to display the set three-dimensional reference range in a substantially spherical form.

The processing circuit may cause the display device to display an image representing the three-dimensional reference range while gradually expanding the image.

According to the third aspect of the present invention, there is provided a video game method for executing a video game in which a plurality of items are prepared, comprising:

a setting step of setting an effective range of each of the plurality of items;

an attaining step of attaining a three-dimensional reference range corresponding to the effective range set by said setting step, the attained reference range having its center at a reference point; and a display step of displaying the attained three-dimensional reference range.

The display step may display the attained three-dimensional reference range in the form of a polyhedron defined by a wire frame or in a substantially spherical form.

A computer readable program for causing a general computer to execute a video game in which a plurality of items are prepared may be recorded on a computer usable recording medium which can be distributed or may be installed into the computer. The program executes the following:

a setting step of setting an effective range of each of the plurality of items;

an attaining step of attaining a three-dimensional reference range corresponding to the effective range set by said setting step, the attained reference range having its center at a reference point; and a display step of displaying the attained three-dimensional reference range.

Moreover, a computer data signal embodied in a carrier wave for causing a computer to serve as a video game device that executes a video game in which a plurality of items are prepared, may be transmitted through a network and a communication line, or may be transferred within the computer. The computer data signal comprises:

a setting program for setting an effective range of each of the plurality of items;

an attaining program for attaining a three-dimensional reference range corresponding to the effective range set by said setting program, the attained reference range having its center at a reference point; and a display program for causing a display device to display the attained three-dimensional reference range.

Other advantages and meritorious features of the present invention will become more fully understood from the preferred embodiments, the claims the drawings, and the brief description of which follows.

BRIEF DESCRIPTION OF THE DRAWINGS

FIG. 3 is a diagram exemplifying reference values of the effective ranges which have been preset one for each of a variety of items, and reference values for a damage imparted on an enemy character;

FIG. 4 is a diagram showing the relationship among the distance between the player character and the enemy character, the hitting probability and the degree of damage;

FIGS. 9A and 9B are flowcharts for explaining an example of the operation of drawing the wire frame;

FIG. 11 is a diagram showing an example of the setting of fighting ability levels of the player character;

DETAILED DESCRIPTION OF THE PREFERRED EMBODIMENTS

An embodiment of a game system according to the present invention will now be described with reference to the accompanying drawings.

Figure 1:
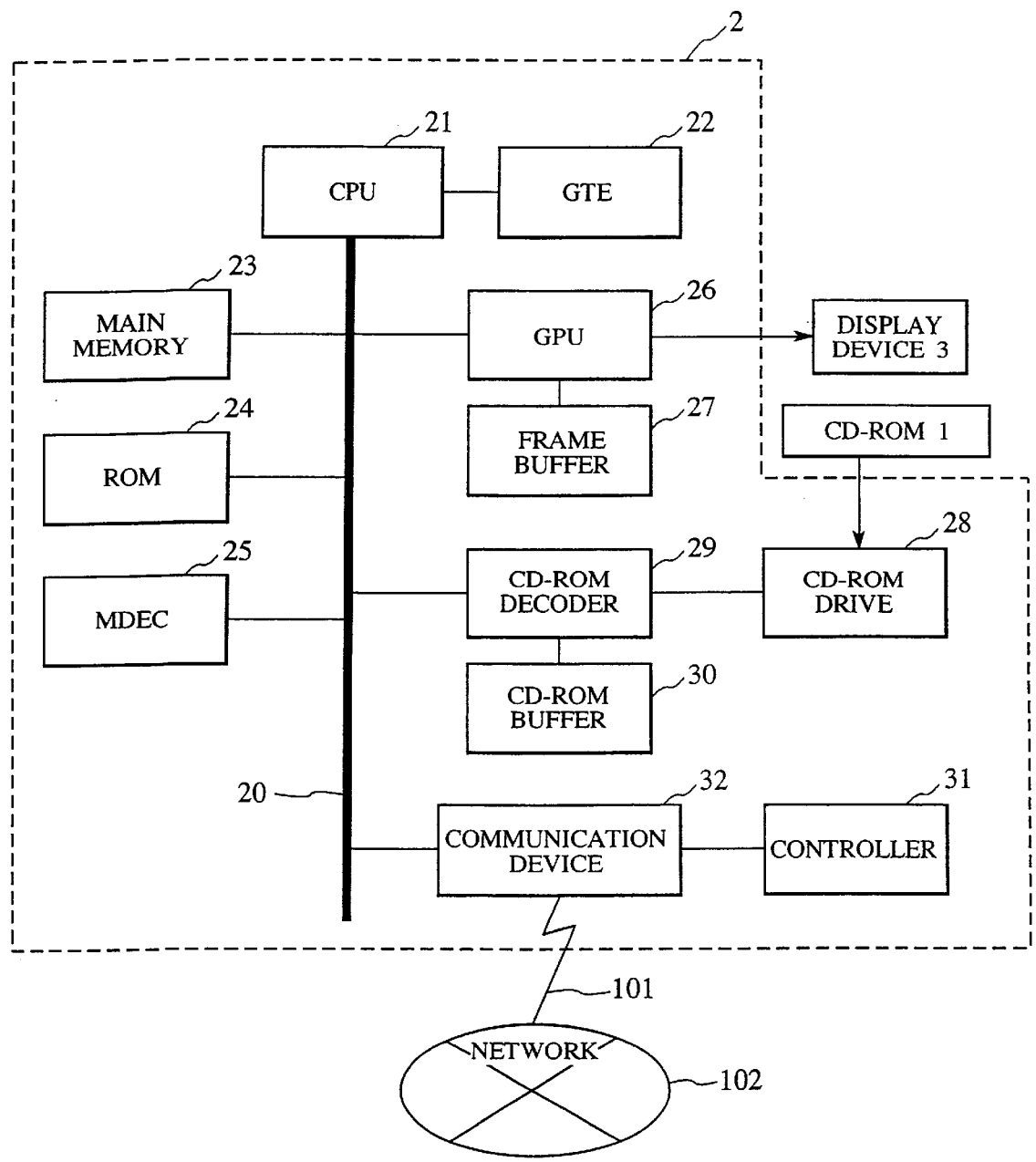
FIG. 1 is a block diagram showing the circuit structure of a game system according to an embodiment of the present invention.

FIG. 1 is a block diagram demonstrating the circuit structure of the game system according to one embodiment of the present invention.

As illustrated, this system comprises a CD-ROM (Compact Disc Read Only Memory) 1, a video game device 2 and a display device 3, for example.

Stored in the CD-ROM 1 is data such as a game program, game screen data, etc.

The display device 3, which comprises a television receiver, a CRT (Cathode Ray Tube), etc., displays images necessary for the game being executed.

The video game device 2 comprises a bus 20, a CPU (Central Processing Unit) 21, a GTE (Geometric Transfer Engine) 22, a main memory 23, a ROM (Read Only Memory) 24, an MDEC (Motion DECoder) 25, a GPU (Graphics Processing Unit) 26, a frame buffer 27, a CD-ROM drive 28, a CD-ROM decoder 29, a CD-ROM buffer 30, a controller 31 and a communication device 32.

The CPU 21, the main memory 23, the ROM 24, the MDEC 25, the GPU 26, the CD-ROM decoder 29 and the communication device 32 are connected to each other via the bus 20.

The CPU 21 executes a program stored in the ROM 24 and a program loaded into the main memory 23, and executes a game in accordance with the operation of the controller 31. The GTE 22, which is a coprocessor for the CPU 21, executes the vector operation such as the coordinate transformation and the light source calculation by way of parallel processing in cooperation with the CPU 21.

The main memory 23, which comprises a semiconductor memory, stores the game program loaded from the CD-ROM 1 and data required to execute the program.

The ROM 24 stores a program for loading the game program, etc. from the CD-ROM 1 into the main memory 23 and for executing the game program, etc.

The MDEC 25, which executes the inverse DCT (Discrete Cosine Transform) operation at high speed, decompresses data read from the CD-ROM 1 in the form of data compressed according to standards such as JPEG (Joint Photographic Expert Group) and MPEG (Moving Picture Expert Group).

The GPU 26, which is a subprocessor that operates independently from the CPU 21, draws images to be displayed on the frame buffer 27 in accordance with drawing instructions from the CPU 21 and on the basis of coordinate and color information obtained by the GTE 22. Furthermore, the GPU 26 reads image data written in the frame buffer 27 and outputs the image data to the display device 3.

The image data is developed on the frame buffer 27 which is a memory having a two-dimensional address space that is managed by the GPU 26.

The CD-ROM drive 28 connected to the CD-ROM decoder 29 drives the CD-ROM 1 and reads the game program, the image data, etc. from the CD-ROM 1. The CD-ROM decoder 29 decodes the data which the CD-ROM drive 28 has read from the CD-ROM 1, and transfers the data to the main memory 23 when needed. The data to be transferred, etc. is temporarily stored in the CD-ROM buffer 30.

Figure 2:
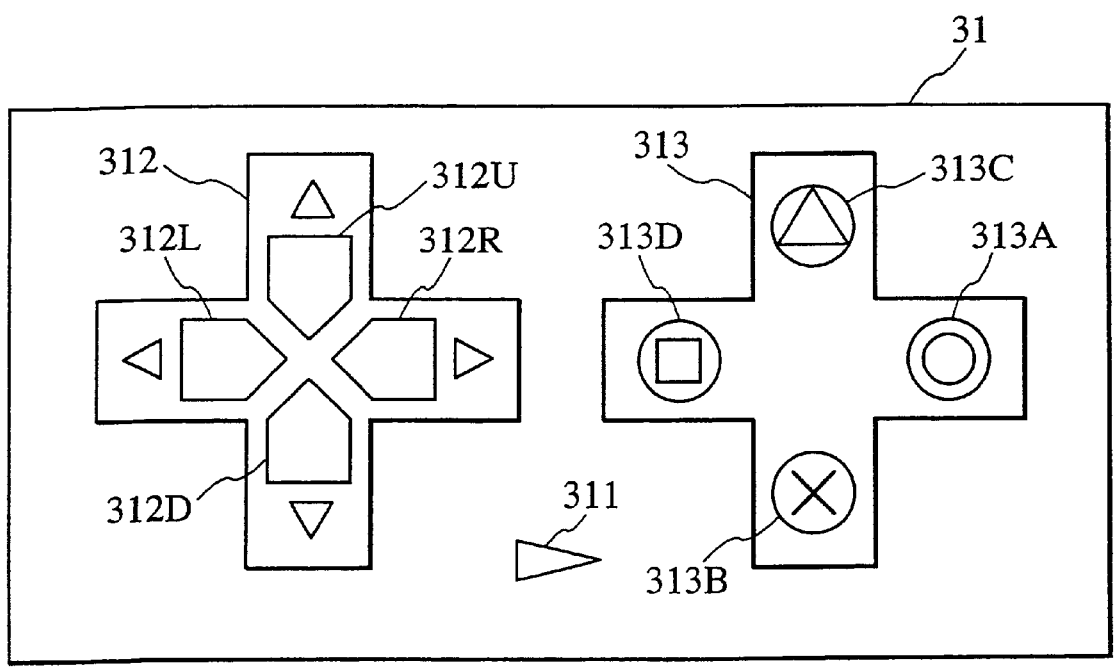
FIG. 2 is a diagram exemplifying the structure of an input device.

The controller 31, connected to the communication device 32, is an input device which is operated by a user and which comprises a plurality of keys for issuing predetermined instructions to the CPU 21. As illustrated in FIG. 2, the controller 31 comprises a start key 311, a group of direction keys 312, a group of instruction keys 313, etc.

The start key 311 is a key for issuing a game start instruction.

The group of direction keys 312 comprises an up key 312U, a down key 312D, a left key 312L and a right key 312R. The direction keys 312U, 312D, 312L and 312R are used to move a player character or the cursor displayed in a window on the screen up, down, left and right.

The group of instruction keys 313 comprises a determination key 313A, a cancel key 313B, a window key 313C and a change key 313D.

The determination key 313A is a key for designating "determination." The determination key 313A is used, for example, to attack an enemy character and to select a desired weapon from weapons displayed in a window.

The cancel key 313B is used to close a displayed window and also to cancel instructions.

The window key 313C is used to issue a window display instruction.

The change key 313D is used to change the opponent to be attacked during a fight.

The communication device 32, to which a line 101 has been connected, performs communications via a network 102 with another device connected to the network.

An example of the game which the above-described video game device executes will now be explained.

The game which will be explained hereinafter is an RPG in which the player character that is operated by a player fights with enemy characters (non-player characters) to defeat them in order to advance the game.

With respect to items (such as weapons, magic, supernatural power, etc. which are used to affect the enemies) that are used by the player character in the game, the shooting range of each item and the damage which each item will impart on the opponent (in other words, the power of each item) have been predetermined as shown in FIG. 3.

Furthermore, as illustrated in FIG. 4, the hitting probability and the degree of damage have also been predetermined depending on the distance between the player character and the enemy character.

The aforementioned hitting probability is the chance that weapons such as arrow(s) and bullet(s) will hit the enemy in the case where the direction of the shot coincides with the position of the enemy. The hitting probability is 100% in the case where the enemy is within the shooting range. However, the hitting probability decreases as the enemy is positioned out of the shooting range.

Moreover, the degree of damage shows what percentage of damage predetermined for each item will be imparted on the enemy if the weapons such as an arrow or a bullet hit the enemy.

The set values shown in FIGS. 3 and 4 are stored in advance in the CD-ROM 1, together with the program, etc.

An example of the operation of the video game device according to this embodiment will now be explained with reference to the drawings.

When the CD-ROM 1 is loaded in the CD-ROM drive 28, the CD-ROM decoder 29 notifies the CPU 21 that the CD-ROM 1 has been loaded. In response to this notification, the CPU 21 executes a loading program stored in the ROM 24, thereby controlling the CD-ROM driver 28 so as to load the game program from the CD-ROM 1 into the main memory 23.

When the start key 311 of the controller 31 for the video game device 2 is operated, an operation signal is sent from the communication device 32 to the CPU 21.

When a player presses the start key 311 on the controller 31 under the above-described condition, the CPU 21 is notified that the key has been pressed. In response to this notification, the CPU 21 initiates the execution of the game program loaded in the main memory 23 and starts the game.

The CPU 21 executes the game in accordance with the game program and instruction signals from the controller 31. In accordance with instructions from the CPU 21, the GPU 26 develops, on the frame buffer 27, image data representing images to be displayed, and the display device 3 displays the images necessary for the game.

Figure 5A:
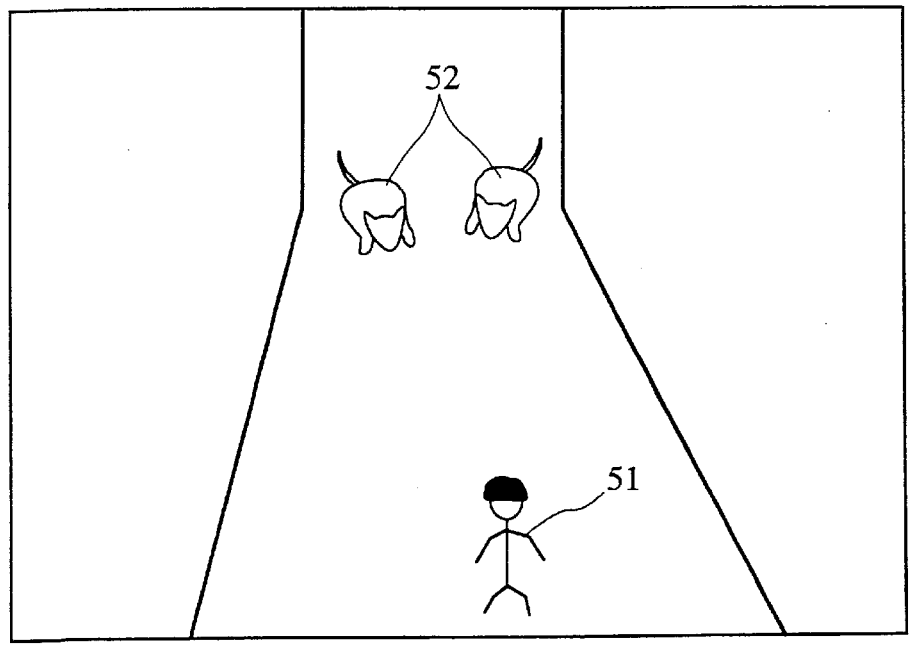
FIG. 5A is a diagram exemplifying the state in which the player character encounters enemy characters while the game is being executed.
Figure 5B:
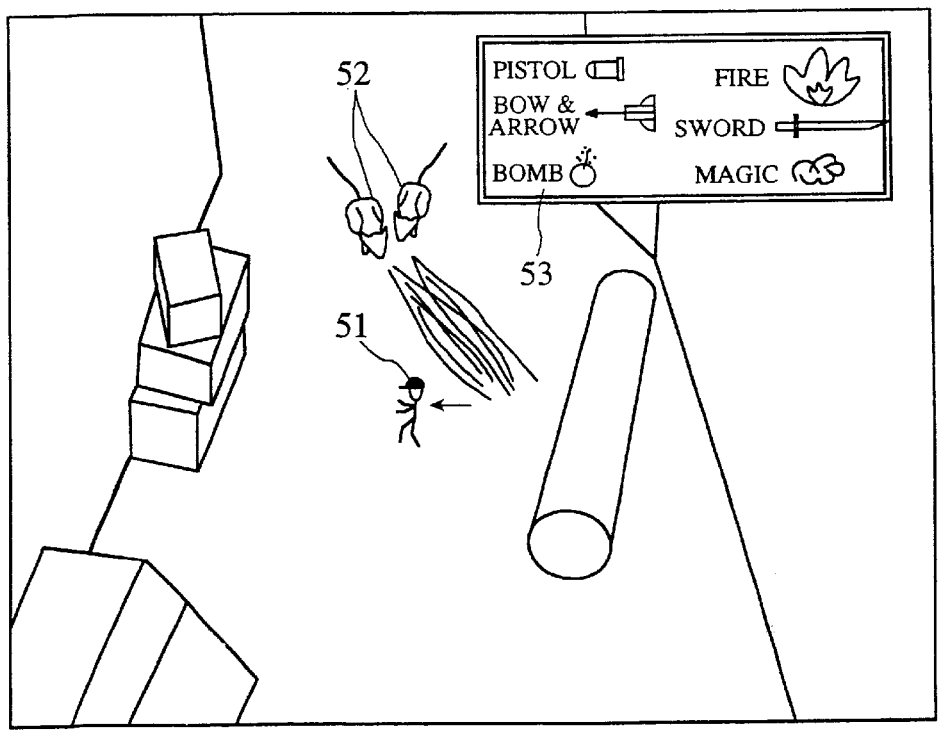
FIG. 5B is a diagram exemplifying the state in which the player character fights with the enemy characters.
Figure 6:
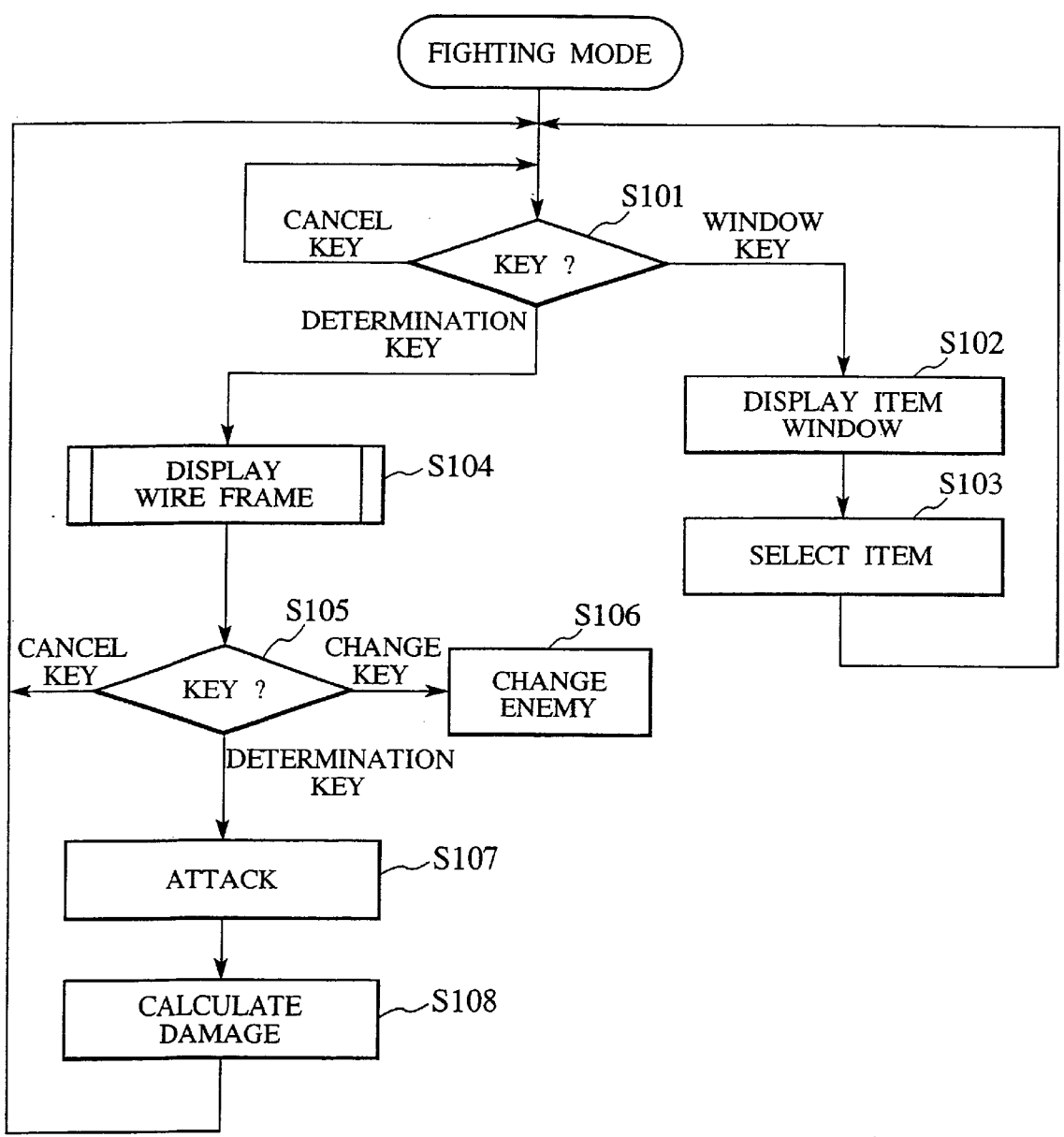
FIG. 6 is a flowchart for explaining the operation of a video game device in fighting mode.

When the player character 51, which is operated by the player, encounters enemy characters 52 as shown in FIG. 5A while the game is being advanced, the game enters a fighting mode in which the player character 51 fights the enemy characters 52, and the CPU 21 starts the process shown in FIG. 6.

First of all, the player presses the window key 313C on the controller 31 in order to select an item to be used to fight the enemy from the items (which affect the opponent character) such as weapons (pistol, bow and arrow, fire, sword), magic, supernatural power, etc.

In step S101 shown in FIG. 6, the CPU 21 detects which key is pressed. If the window key 313C is pressed, the CPU 21 controls the display device 3 to display an item window 53 for the item selection (step S102).

When the player selects an arbitrary item by operating the controller 31 from the items displayed in the item window 53, the CPU 21 determines the item as one to be used for an attack (step S103).

Thereafter, the flow returns to step S101.

In the case where the cancel key 31 3B is pressed, the item window 53 is closed and the flow of the process returns to step S101.

In the case of attacking the enemy characters 52 by using the selected item, the player presses the determination key 313A.

Figure 7:
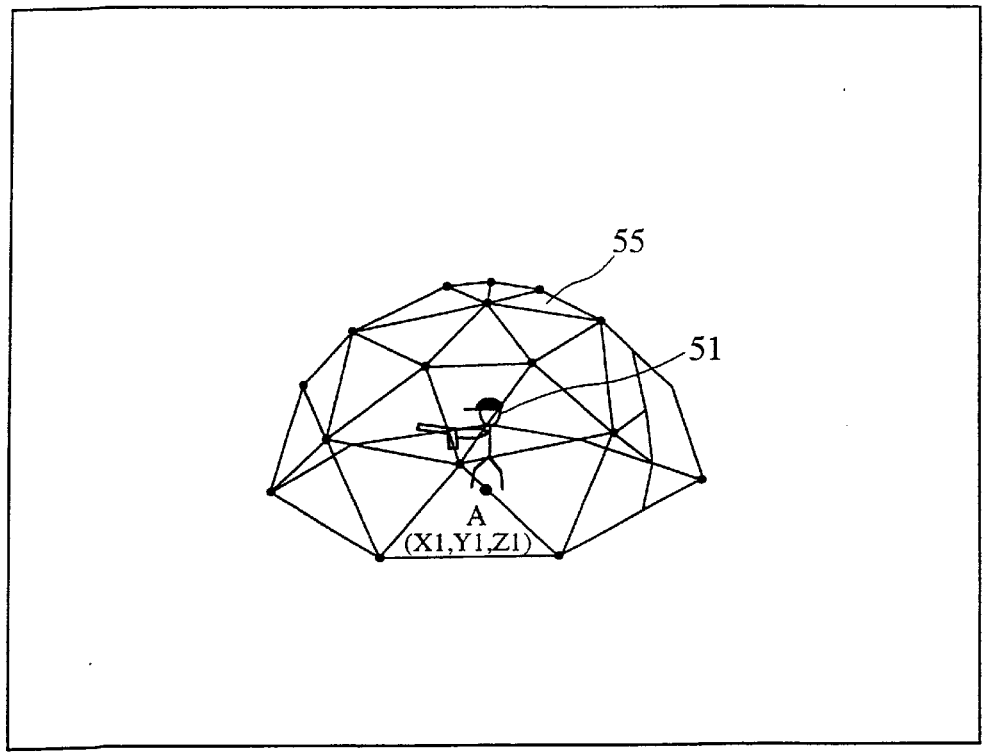
FIG. 7 is a diagram illustrating a wire frame which defines the effective range of an item which is used by the player character.
Figure 8:
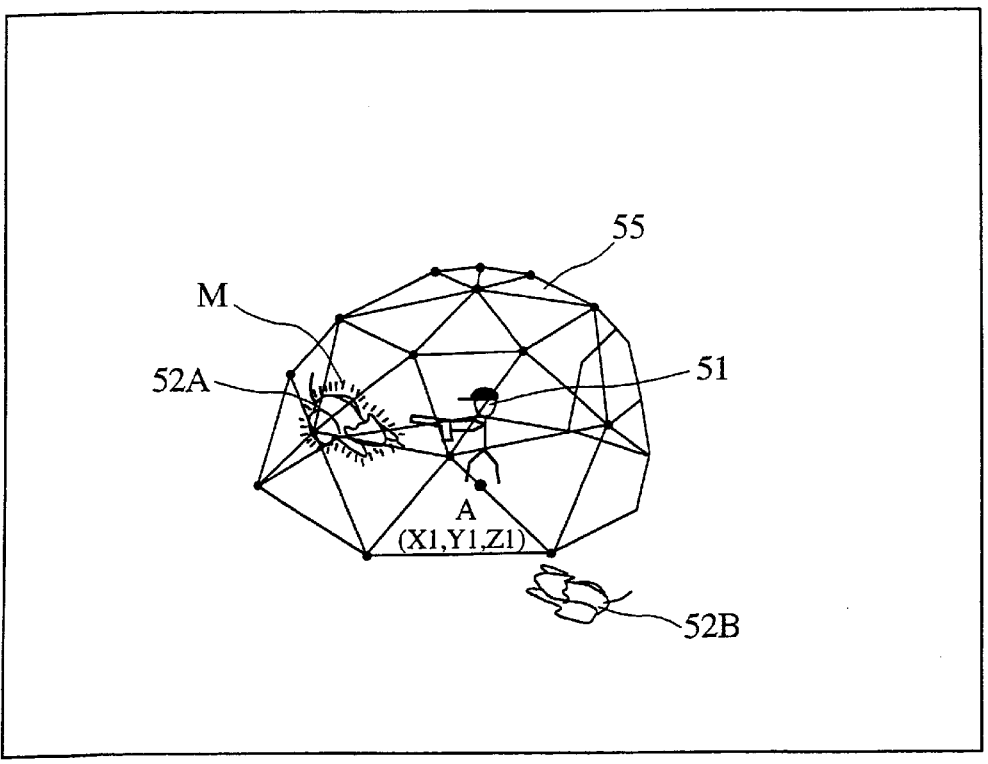
FIG. 8 is a diagram showing the state in which the enemy characters are inside the wire frame defining the effective range of the item which is used by the player character.

If the CPU 21 detects that the determination key 313A is pressed, the CPU 21 controls the display device 3 to display a wire frame 55 which defines the effective range (the weapon shooting range when the item is a pistol or a bow and arrow) of the item so that the center of the wire frame 55 is positioned at the player character 51, as shown in FIG. 7 (step S104). Of the enemy characters 52, an enemy character 52A which is located inside the wire frame 55 and an enemy character 52B which is located outside the wire frame 55 are displayed in different modes, as illustrated in FIG. 8. In the example shown in FIG. 8, mark M is put on the enemy character 52A located inside the wire frame 55, while such a mark is not put on the enemy character 52B located outside the wire frame 55. The enemy characters may be displayed in different colors or with different brightness. The method for displaying the wire frame 55 will be explained later.

From the displayed wire frame 55 and the display modes of the enemy characters 52, the player can instantly judge whether an attack will be effective, whether there are any more suitable enemies, etc.

If necessary, the player can change the opponent to be attacked, by pressing the change key 313D, for example (steps S105 and S106). After this, the flow of the process returns to step S101.

In the case of attacking the enemy, the player presses the determination key 313A, whereby the player character 51 attacks an enemy character 52 with the item (steps S105 and S107). When the item selected by step S105 is a "pistol", for example, the player character 51 shoots the pistol, aiming at the enemy character 52. When the selected item is "magic", the player character 51 imparts damage on the enemy character 52 with magic. The processing required for this attack is the same as that in the case of an ordinary video game program.

Subsequently, the damage imparted on the enemy character 52 by this attack is calculated, the processing according to the damage is performed (step S108), and the flow returns to step S101.

For example, let the case be considered wherein the player character 51 has shot at the enemy character 52A located inside the wire frame 55 illustrated in FIG. 8. If the trajectory (direction) of the bullet as shot coincides with the position of the enemy character 52A, the processing is carried out under the condition wherein the bullet has hit the enemy character 52A, since the hitting probability when the distance between the player character and the enemy (the shooting range) is less than or equal to 100% of the shooting range is defined as 100% in FIG. 4. The damage (reference value) to the enemy due to the "pistol" is defined as "10" in FIG. 3, while the degree of damage showing what percentage of the above damage will be actually imparted on the enemy character is defined as "100%" in FIG. 4. Hence, the damage to the enemy character 52A is derived as "10" from 10×100%=10.

Next, let the case be considered wherein the player character 51 has shot at the enemy character 52B located outside the wire frame 55 illustrated in FIG. 8 and the trajectory of the bullet as shot is coincident with the position of the enemy character 52B. Assume that the distance between the player character 51 and the enemy character 52B is equal to 140% of the distance (shooting range L) between the player character 51 and the wire frame. In this case, since the hitting probability when the shooting range L is 140% is defined as 50% in FIG. 4, the probability calculation is performed to determine whether the bullet has hit or missed the enemy character 52B. If it is determined that the bullet has missed the enemy character 52B, a damage to the enemy character 52B is "0." On the other hand, if it is determined that the bullet has hit the enemy character 52B, damage to the enemy character 52B is "3", that is, 30% of the defined damage (reference value) "10" from the pistol.

Meanwhile, in the case where the player judges from the wire frame 55 displayed by step S104 that the enemy character 52 is outside the effective range of the item, the player presses the cancel key 313B to stop the attack. In this case, the process returns to step S102, and the player operates the direction keys 312U, 312D, 312L and 312R to move the player character or select another item.

Thus, according to this embodiment, the attacking range of the player character 51 is displayed as a hemisphere (a substantially hemispherical polyhedron) defined by the wire frame 55. This permits the player to easily judge the attacking range in which the weapon is effective and the positional relationship between the player character 51 and the enemy character 52.

Thus, viewing the three-dimensional effective range displayed as the wire frame 55, the player can judge whether an attack will be effective or not, and can make a decision whether to launch an attack, stop an attack, replace the selected item with another or change the opponent to be attacked.

The method for drawing the wire frame 55 in step S104 will now be described.

Figure 9B:
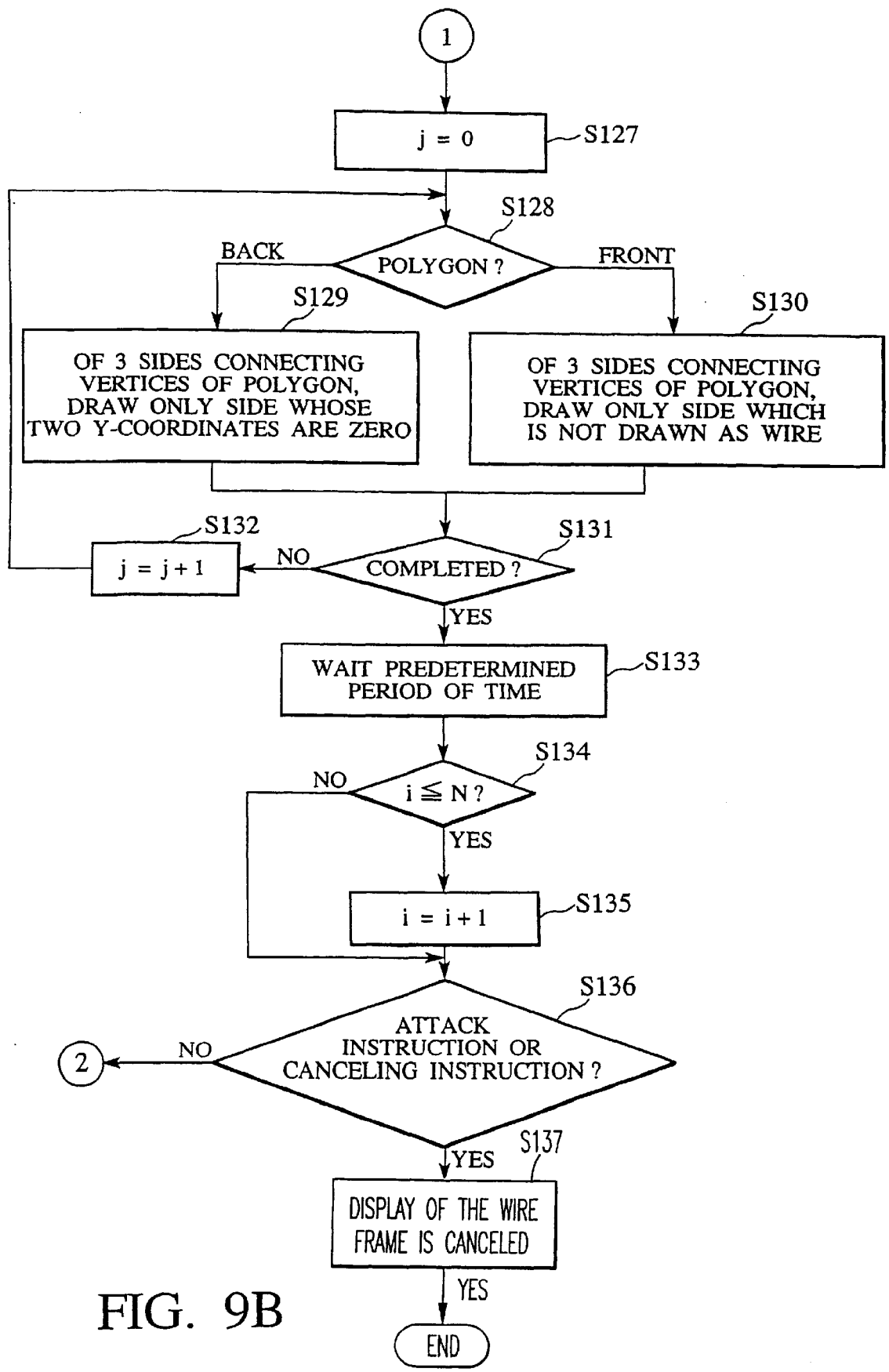
Figure 10A:
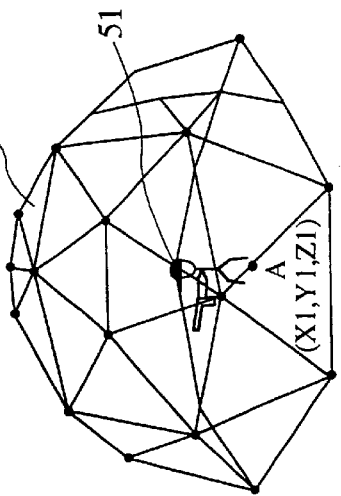
FIGS. 10A to 10E are diagrams exemplifying how the displayed wire frame varies.
Figure 10B:
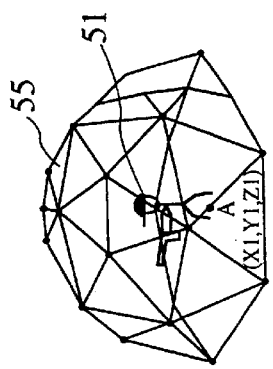
Figure 10C:
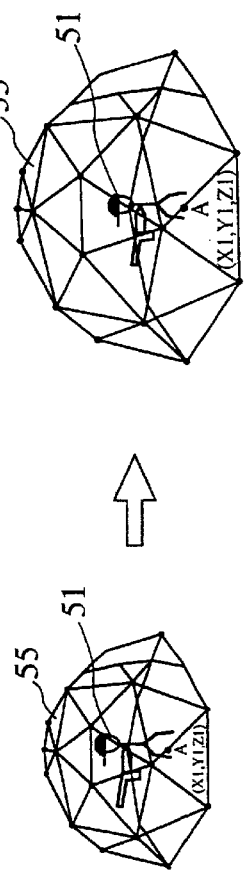
Figure 10E:
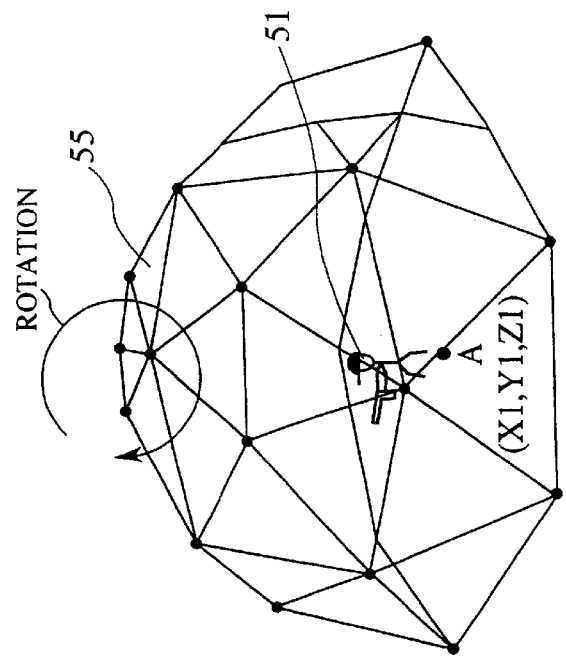
Figure 10D:
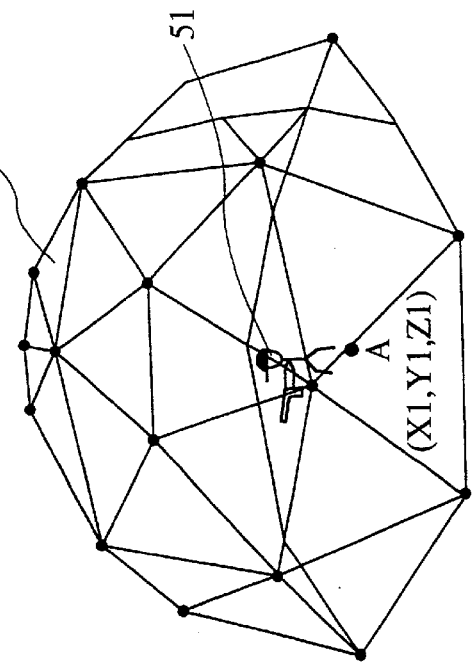

First of all, the CPU 21 initiates the process shown in FIGS. 9A and 9B when the determination key 313A is pressed in the fighting mode. However, it should be noted that the wire frame drawing process shown in FIGS. 9A and 9B and the game process shown in FIG. 6 are executed in parallel with each other on a time divisional basis.

First, the CPU 21 obtains the shooting range L which has been set for the selected weapon from the preset data shown in FIG. 3 (step S121).

The CPU 21 determines the spatial position (X1, Y1, Z1) of the player character 51 which is specified by three-dimensional coordinates in the virtual space (step S122).

The GPU 26 sets a variable i at 1, which variable represents the number of repeating times (step S123).

Next, the CPU 21 attains a substantially hemispherical 3D model which is defined by a wire frame made up of a plurality of polygons and whose radius R is expressed as $R=L \times i/N$, and calculates the coordinates (X, Y, Z) of the vertexes of each polygon in the virtual space (step S124).

Next, in order to display the hemispherical 3D model two-dimensionally on the screen, a determinant for use in the 3D-2D transformation is determined based on the position of a viewpoint (or a camera) (step S125).

The CPU 21 notifies the GPU 26 about the three-dimensional coordinates of each vertex of the polygons forming the wire frame which defines the hemispherical 3D model and the determinant for use in the coordinate transformation, and the CPU 21 issues an instruction to draw the image of the wire frame.

In accordance with the notification, the GPU 26 transforms the coordinates of each vertex of the individual polygons forming the hemispherical wire frame model into values for the model when projected on the two-dimensional display screen, through utilization of the determinant to be used in the coordinate transformation (step S126).

Next, a variable j which represents polygon number is set at 0 (step 10 S127), and the following process is conducted with respect to the j-th polygon.

Firstly, it is determined whether the j-th polygon is a front-facing polygon or a back-facing polygon (step S128).

With respect to the j-th polygon determined as being a back-facing polygon, only the side connecting two vertexes whose Y coordinates are "0", among the three sides connecting the vertexes of the polygon, is drawn using a semi-transparent wire on the frame buffer 27 (step S129).

Furthermore, in regard to the j-th polygon determined as being a frontfacing polygon, only sides other than those which have already been drawn as the sides of other polygons, among the three sides connecting the vertexes of the front-facing polygon, are drawn using semi-transparent wires on the frame buffer 27 (step S130). The wires forming the wire frame are semi-transparent lines. If the wires were drawn overlapping one another, the display color of the wires would change. Thus, before a side is drawn, it is determined whether the side has already been drawn or not, and if it is determined that the side has already been drawn, the side will not be drawn again.

When the sides of one polygon have been drawn, it is determined whether the drawing process has been completed as for all polygons (step S131). If the drawing process has not yet been completed as for all polygons, "1" is added to the variable j (step S132), a return to step S128 is made, and the process is performed as for the next polygon.

When it is determined in step S131that the process has been completed as for all polygons, there is a wait of a predetermined period of time which corresponds to, for example, the period of time [1/30 of a second in the case of NTSC (National Television Standards Committee) scheme] which the display device 1 needs to display one frame (step S133).

After the predetermined period of time, it is determined whether the variable i is equal to the divisor N (step S134). When the variable i is less than N, "1" is added to the variable i (step S135), a return to step S124 is made, and a hemispherical wire frame whose radius R is expressed by $R=L \times i/N$ is displayed in regard to the new variable i. At that time, the wire frame is rotated around the Y-axis by a predetermined angle from the previous display position.

Thereafter, the same operations as those described above are repeated, and the hemispherical wire frame model, which expands gradually while rotating around the Y-axis, is displayed with its center being positioned at the player character 51.

When the radius of the hemisphere representing the effective range reaches the maximum value L, it is determined in step S134 that the variable i is equal to N, and the variable i is not updated hereafter. In step S136, an enemy character inside the wire frame and an enemy character outside the wire frame are displayed in different modes.

Following the above, it is determined whether an instruction to execute an attack using an item has been issued by pressing the determination key 313A or whether a canceling instruction has been issued by pressing the cancel key 313B (step S136). If those instructions are not issued, the flow returns to step S124.

As a result, no change occurs in the size of the hemisphere defined by the wire frame, and the wire frame rotates around the Y-axis at a predetermined speed.

On the other hand, when it is determined in step S136 that an instruction to execute an attack using an item has been issued by pressing the determination key 313A or that a canceling instruction has been issued by pressing the cancel key 313B, the display of the wire frame is canceled (step S137), and the wire frame drawing process shown in FIGS. 9A and 9B is finished.

When the determination key 313A is pressed during the fighting mode in the process shown in FIGS. 9A and 9B, the hemispherical wire frame model is displayed as shown in FIGS. 10A to 10E. At the beginning, the hemispherical wire frame 55, having its center at the position of the player character 51, gradually expands while rotating around the Y-axis. When the radius reaches the maximum value L, the hemispherical wire frame 55 does not expand any more and keeps rotating at a constant speed. Thus, the player can recognize the effective range of the item to be used, enhancing the reality of the game.

In the above explanations, the effective range L of each item is fixed. However, the range L may vary under certain conditions.

For example, in the case where the player character 51 is in a predetermined status (e.g. in the state where the player character is in the dark) while being attacked by the enemy characters 52, a distance specific to that status is set as the shooting range L, whereas in the case of the normal status, a distance specific to each item as shown in FIG. 3 may be set as the shooting range L.

When achieving the above, the current status is discriminated in step S121 of FIG. 9A. In the case where the current status is a specific status, a value specific to that status is set as the shooting range L, instead of reading the shooting range L specific to each item, whereas in the case of the normal status, a value specific to each item is set as the shooting range L.

The game will become more entertaining if the shooting ranges of the respective weapons are set different from each other depending on the skills of the player character and how the weapons are tuned.

FIG. 11 is a table in which the fighting ability levels of the player character 51 have been set in accordance with data when the player character 51 fought with enemy characters 52. The fighting ability levels of the player character 51 are divided in levels 3 to 1 according to data representing the kinds of the items used against the enemy characters 52, the number of shots and the period of time required to defeat the enemy characters 52. In this embodiment, level 3 represents the highest ability.

The CPU 21 determines the fighting ability with reference to fighting data concerning fights in the past and the data table of FIG. 11. For example, let it be assumed that the player character 51 defeated a rat in the past with the pistol. Let it be further assumed that the number of bullets as shot to defeat the rat is 3 and the fighting time in that case is 14 seconds. Then, the CPU 21 determines the fighting ability as "3", since the number of shots is less than 5 and the fighting time is shorter than 15 seconds. The data table employs classification according to the kinds of the enemy characters 52. Therefore, if the player character 51 has defeated a variety of enemy characters 52 in the past, then the fighting ability levels determined in one-to-one correspondence with the kinds of the enemy characters 52 are averaged.

In addition, the number of fighting ability levels and data for level determination are not limited to those shown in FIG. 11. In FIG. 11, levels 1 to 3 are available as the fighting ability levels. However, the number of levels may be two or less, or may be four or more. Further, the fighting data may include the number of shots and the fighting time only. Moreover, the fighting ability can also be determined based on data such as the number of enemies defeated within a unit time, etc. Furthermore, in the case where the player has defeated a variety of enemies, the maximum or minimum of the fighting ability levels determined in one-to-one correspondence with the enemies may be adopted as the fighting ability of the player. The conditions of the characters are not limited to the skills of the characters, and may include the stamina (which may be energy or fuel) of the characters, the kinds of the characters, the conditions of the bodies of the characters (e.g. the case where the characters are wounded and the conditions in which the characters cannot freely move their arms and legs).

Figure 12:
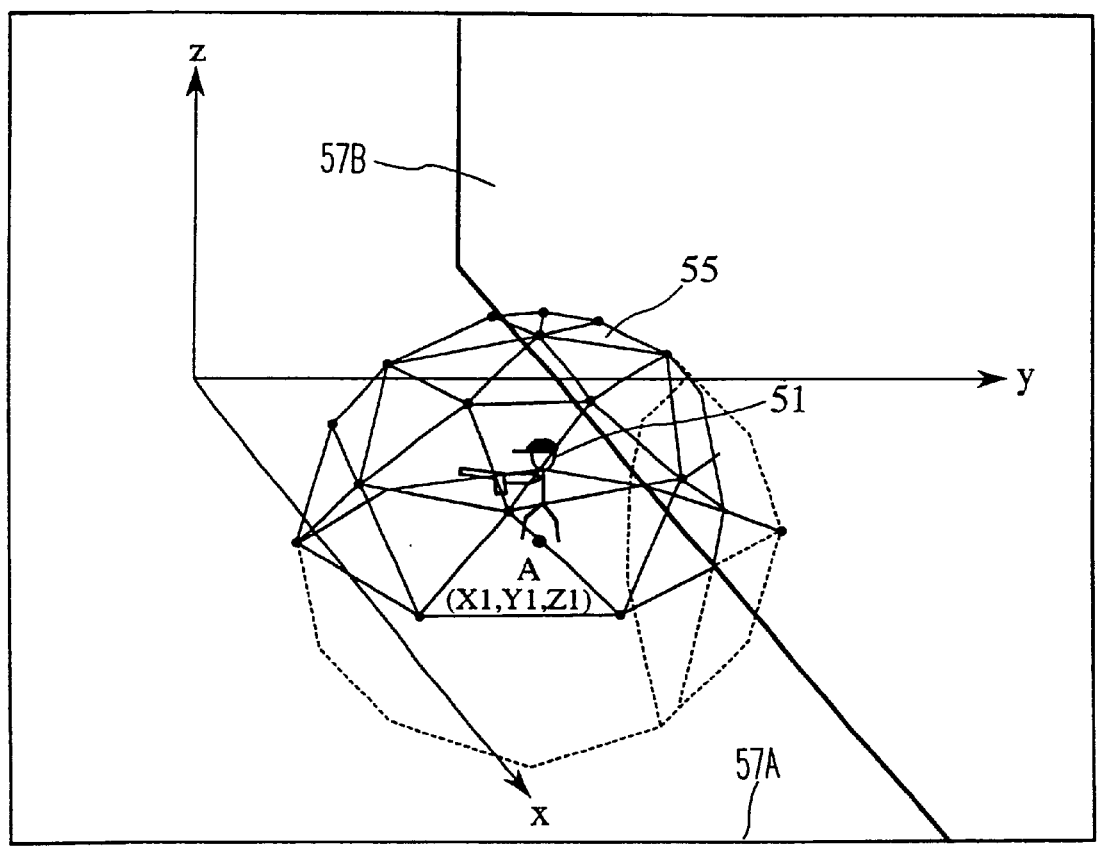
FIG. 12 is a diagram exemplifying the displayed wire frame which defines the effective range and from which a region located inside a wall has been eliminated.

It is preferred that a field, which is displayed during the game, be an uneven field where a large number of objects that limit the effective ranges of the items are arranged. In such a case, the wire frame may be displayed not to include the object areas. FIG. 12 illustrates an example of the polyhedron 55 having its center at the standing position A of the player character 51 and displayed in the state wherein regions located inside a floor 57a and a wall 57b, which are in contact with the polyhedron 55, have been eliminated from the polyhedron 55. Of the wire frame, the parts shown in broken lines are not displayed.

Moreover, the method for displaying the wire frame is not limited to the one described above, and various modifications and application can be realized when needed.

Figure 13A:
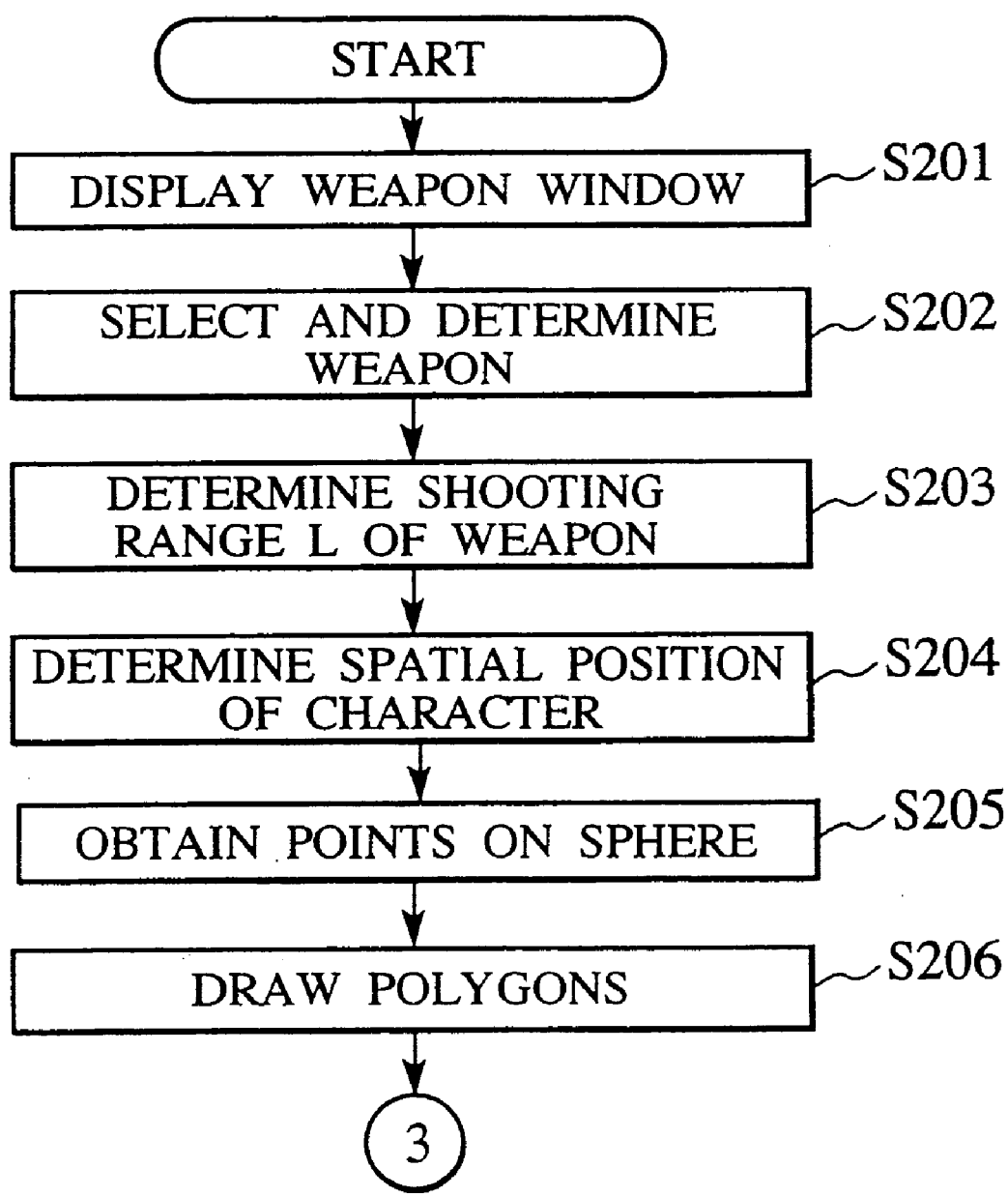
FIGS. 13A and 13B are flowcharts for explaining another example of the operation of drawing the wire frame for the player character.
Figure 13B:
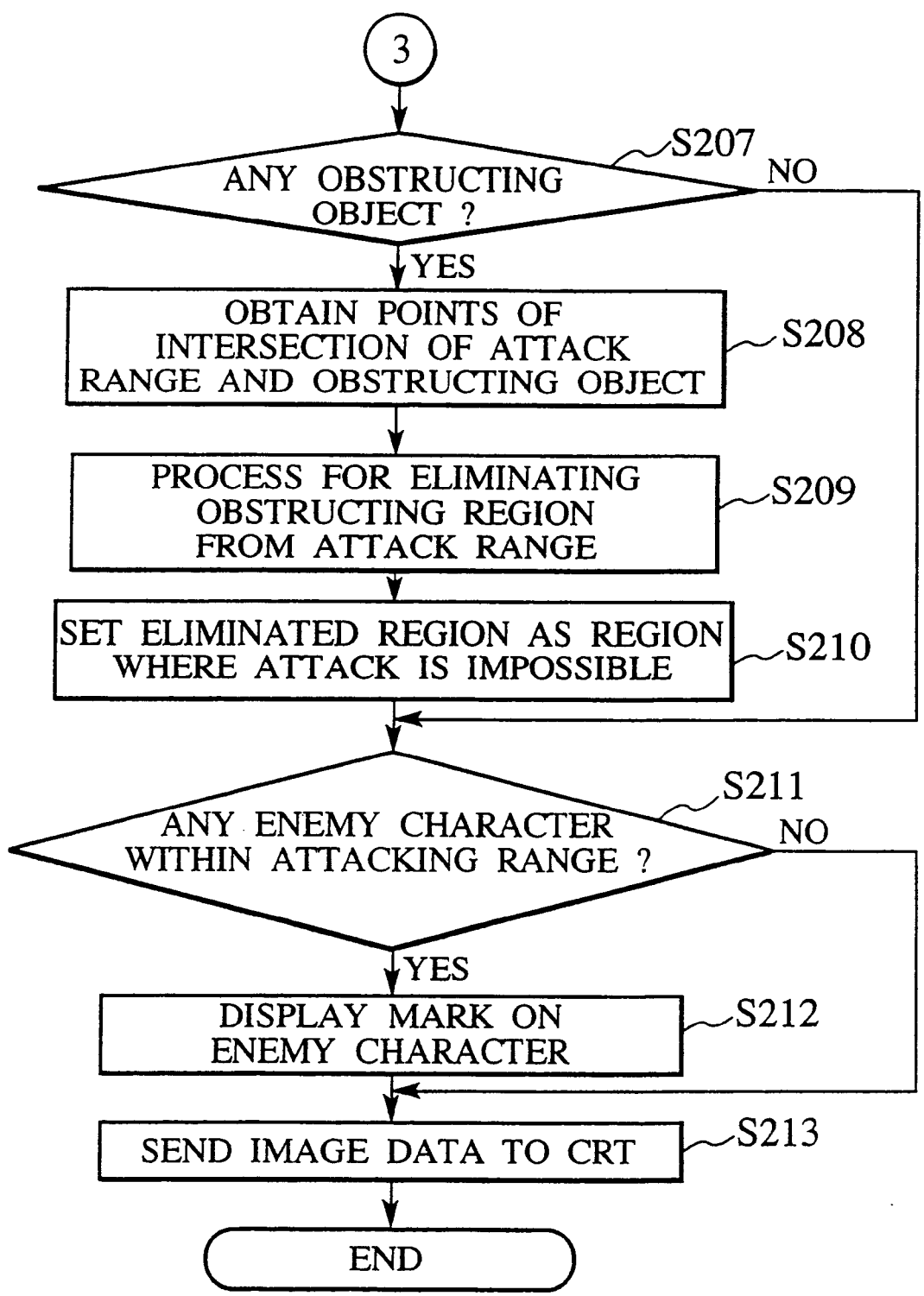

A modification of the wire frame drawing process will now be explained with reference to FIGS. 13A and 13B.

When the player presses the window key 313C of the controller 31, the CPU 21 displays, on the display device 3, the selection of weapons which he player character 51 is equipped with (step S201). When the player selects a weapon from the displayed weapons, the CPU 21 determines the selected weapon as that to be used for an attack (step S202).

When the player presses the determination key 313A under the condition wherein the weapon has been selected, the process for displaying he shooting range is started.

First, the CPU 21 obtains the shooting range L which has been set at for the selected weapon (step S203).

Next, the CPU 21 derives the coordinates of the position A of the player character 51 from the position A of the player character 51 which is specified by three-dimensional coordinates in the virtual space (step S204).

Figure 14:
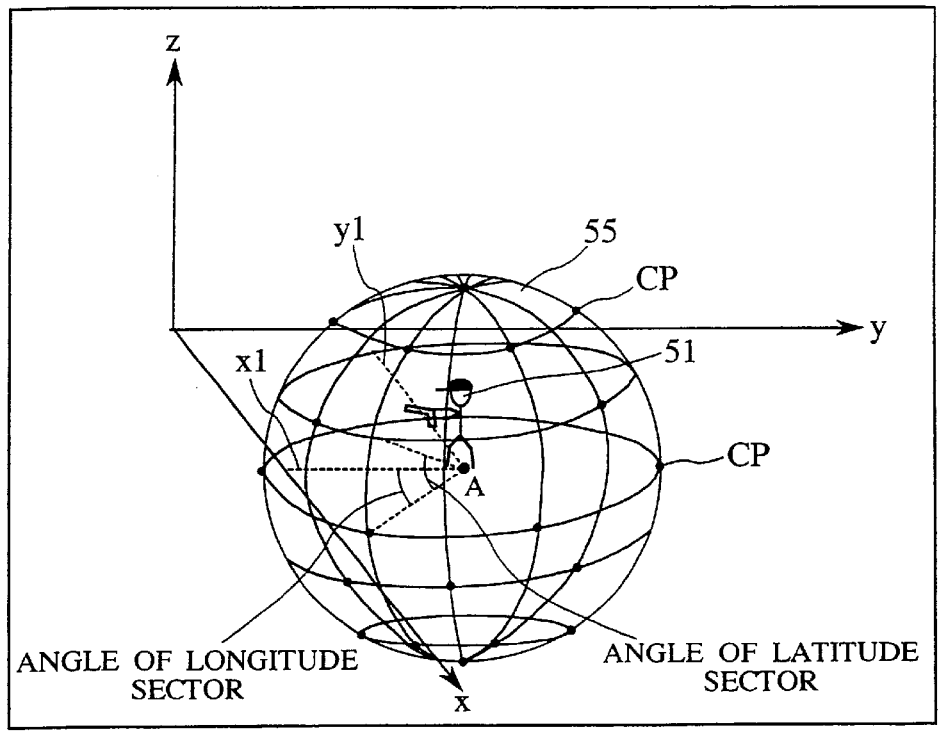
FIGS. 14 to 16 are diagrams for explaining the operation of drawing the wire frame defining the effective range.

Subsequently, as shown in FIG. 14, the CPU 21 obtains a locus of points CP located at the distance L apart from the center or the position of he player character 51 (step S205).

In FIG. 14, intersection points are obtained by dividing latitudes and longitudes into sectors each having a predetermined angle (30°), assuming that the standing position A of the player character 51 is the center of the sphere and that the horizontal directions and the vertical direction are 0° and 90°, respectively. Further, one point of each adjacent pair of intersection points thus obtained is selected as a point CP.

Figure 15:
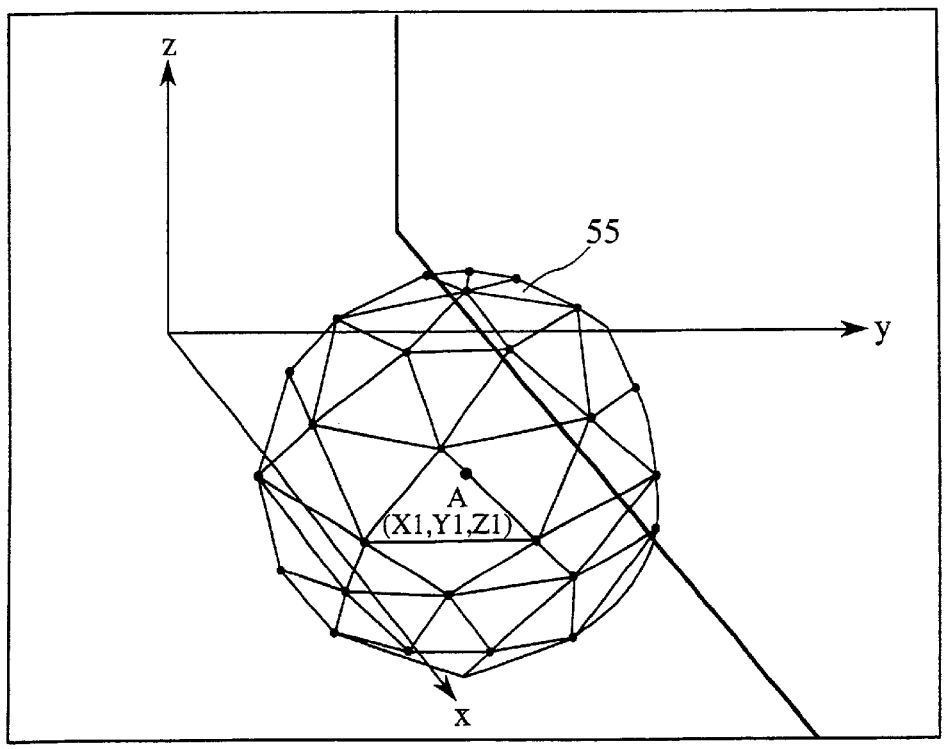

The CPU 21 sends coordinate data representing the coordinates of the points and color data to the GPU 26 so that the GPU 26 draws polygons as illustrated in FIG. 15 (step S206). As a result, the attacking range of the player character 51 is displayed as a wire frame such as that illustrated in FIG. 15.

Next, the CPU 21 determines whether there are any obstructing objects 57 (e.g. floor 57a and wall 57b)through which attack from the player character 51 would not be effective (step S207). When it is determined that there are no obstructing objects 57 which are in contact with the polyhedron 55 defining the attacking range, no part of the polyhedron 55 is eliminated, and the process advances to step S211 which will be explained later. In consequence, the wire frame 55 in the form of a sphere is displayed.

On the other hand, in the case where the polyhedron 55 is in contact with an obstructing object 57, the CPU 21 obtains the points of intersection of the polyhedron 55 and the obstructing object 57 (step S208), and that portion of the polyhedron 55 which is located inside the obstructing object 57, with respect to the plane where the line connecting the points of intersection lies, is eliminated (step S209). As a result, the spherical wire frame 55 whose part or parts have been cut off or which has been deformed depending on the shape of the object 57, is displayed. At that time, based on the program stored in the CD-ROM 1, the CPU 21 instructs the GPU 26 to cause a borderline between the polyhedron 55 defining the attacking range and the object 57 to be different in color from other lines. Due to this, the GPU 26 displays the wire forming that part of the wire frame which borders on the object 57 in a color different from that of the other wires. By thus making a color differentiation, the three-dimensional effect can be applied to the attacking range.

Figure 16:
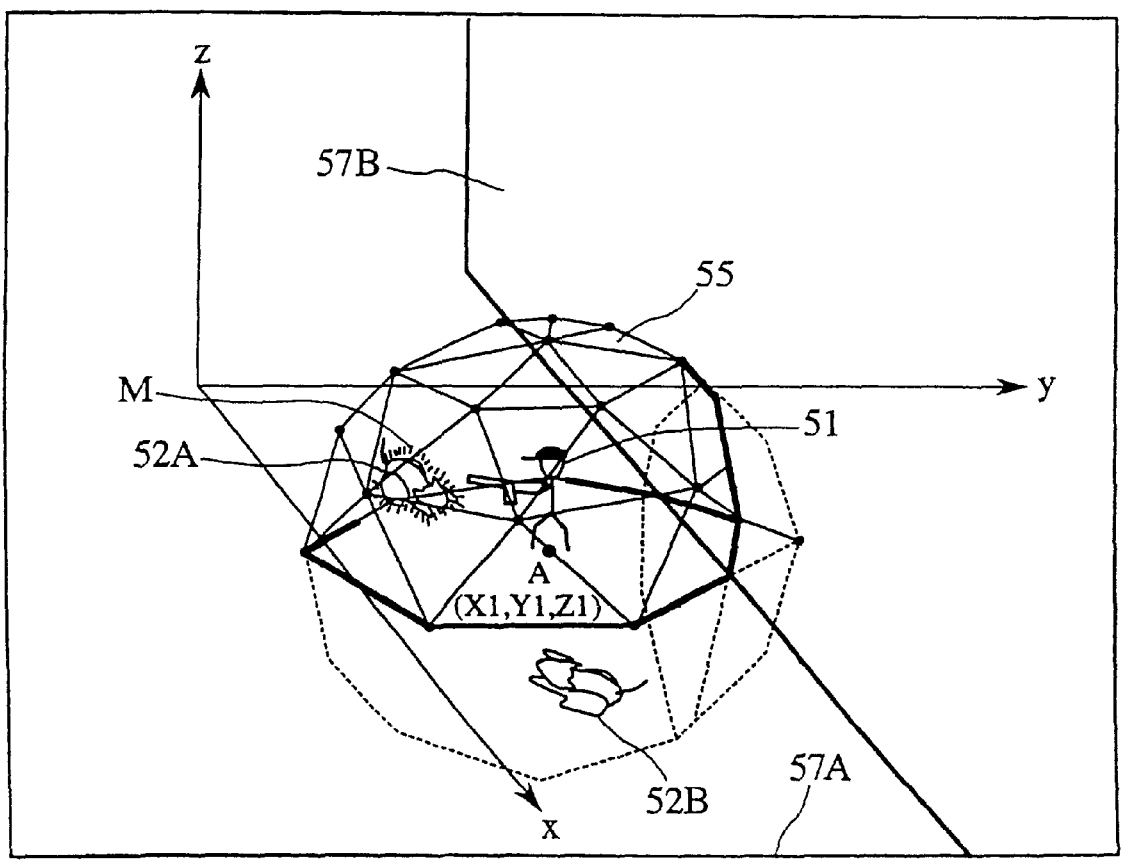

FIG. 16 is a diagram exemplifying the polyhedron 55 having its center at the position A where the player character 51 is standing and displayed in the state wherein the regions located inside the floor 57a and the wall 57b forming the obstructing objects 57 have been eliminated from the polyhedron 55. In FIG. 16, only that part of the wire frame 55 which defines the upper hemisphere is displayed because the player character 51 is standing on the floor 57a. That part of the wire frame 55 which overlaps with the wall 57b is not displayed as well. Of the wires forming the wire frame, the wires which border on the floor 57a and the wall 57b are displayed in a color different from that of other wires (in FIG. 16, the wires which border on the floor 57a and the wall 57b are illustrated as thick lines).

Next, in accordance with the program of the CD-ROM 1, the CPU 21 carries out a process for setting the eliminated regions as those where an attack cannot be made (step S210). That is, in order to prevent the characters 51 and 52 and the weapon from entering those regions, the positions of the characters and weapon are controlled so that the coordinates of the positions of the characters and weapon do not overlap with those of the aforementioned regions.

Subsequently, the CPU 21 determines whether any enemy character 52 is present within the wire frame or polyhedron 55 (step S211). When the CPU 21 determines that an enemy character 52 is present within the polyhedron 55, the CPU 21 displays a mark (lights up a red mark, for example) at the position of the enemy character 52 (step S212), as in the case of the enemy character 52A illustrated in FIG. 16. On the other hand, when no enemy character is within the polyhedron 55 in which an attack is effective, the CPU 21 displays no mark, as in the case of the enemy character 52B illustrated in FIG. 8.

After such image processing, the GPU 26 sends, to the display device 3, the image data of the polyhedron 55 from which a portion overlapping with the obstructing object 57 has been eliminated, and if necessary, data concerning a mark on the enemy character 52 as well (step S213).

The range in which an attack using each item is effective is specified also by such a procedure. Furthermore, if there is any object which narrows the effective range, this is also taken into consideration.

The above-described embodiment of the present invention is merely an example, and the present invention is not limited thereto.

For example, in the above-described embodiment, a hemispherical wire frame having a radius equal to the item's shooting range L shown in FIG. 3 is displayed on the screen as the reference range representing (corresponding to) the effective ranoe of thc item. with the position A of the player character 51 being set as a reference point. However, the size and shape of the displayed range are arbitrary, insofar as the displayed range serves as one to help the player to recognize the effective range of the item. For example. as seen trom FIG. 3, even if the player character 51 by a distance expressed by 1.8×L, the hitting probability is 0% and accordingly, no damage is imparted on the enemy character 52. In this case, (a wire frame representing) a hemisphere having a radius equal to the distance (1.8×L) which corresponds to 180% of the shooting range L shown in FIG. 3 may be displayed as the three-dimensional reference range representing the effective range. Viewing the displayed range, the player can recognize that an attack, if imparted on the enemy character 52 located outside the reference range, will be useless. Moreover, recognizing the position of an enemy character 52 located inside the reference range, the player can determine whether an attack on the enemy character 52 will be effective.

Furthermore, a hemisphere having a radius equal to a distance (L/2) which corresponds to 50% of the shooting range L shown in FIG. 3 may be displayed as the three-dimensional reference range representing the effective range. In this case also, the player can recognize that an attack if imparted on the enemy character 52 located outside the reference range will be useless. Moreover, recognizing the position of the enemy character 52 located inside the reference range, the player can determine whether an attack on the enemy character 52 will be effective.

In other words, the present invention encompasses displaying the three-dimensional reference range corresponding to the item's effective range so that the player can directly or indirectly recognize the effective range.

Further, the item's effective range, for example, is not necessarily displayed as a three-dimensional image such as a sphere or a polyhedron defined by a wire frame. The effective range may be displayed, for example, in a streamline shape different from a sphere or a polyhedron or in a misty shape whose border is indefinite. Further, the color differentiation representing the three-dimensional attacking range is not limited to that between a line bordering upon the floor and other lines. For example, the color differentiation may be applied to a borderline between the attacking range and other objects such as a wall and a ceiling or any other objects such as a mountain or a rock existing in the character's environment. Furthermore, the color differentiation is not limited to that applied to a line, and can be applied also to a surface.

According to the above explanations, the player selects one of the items. However, in the case where the game is executed while the character only has one kind of weapon, for example, weapon selection is not necessary.

In the above explanations, the game program is supplied to the video game device 2 from the CD-ROM 1. However, in place of the CD-ROM 1, a semiconductor memory or a variety of magnetic or optical recording mediums, such as a hard disk and a floppy disk, can also be used as the medium from which the game program and data are supplied.

The video game device of the present invention may be the type in which a game machine, a display device and a controller form an integral unit.

Moreover, the video game device of the present invention can be realized using not only a game dedicated device, but also a general purpose personal computer. For example, the video game device which carries out the above-described processes can be attained by installing the same program as that stored in the CD-ROM 1 into the computer from a recording medium having the program stored therein.

Further, the medium from which the program is supplied to the computer (e.g. the video game device 2) may be a communication medium [which temporarily stores the program as in the case of a communication line (e.g. the line 101), a communication network (e.g. the network 102) and a communication system]. For example, the program may be downloaded from a bulletin board system (BBS) for the communication network, and may be distributed through the network in the form of a data stream or a train of signals embedded in (superimposed on) carrier waves. The above-described processes can be carried out by running and executing the program under the control of an OS, in the same manner as other application programs.

What is claimed is:

1. A video game device, which executes a game wherein a first character, whose actions are controlled by input instructions from a player, fights with a second character with an item, said device comprising:
   effective range setting means for setting a three-dimensional effective range which has its center at a predetermined reference point and where the item to be used by said first character for fighting with said second character is effective;
   three-dimensional image processing means for causing a display device to display a three-dimensional reference range corresponding to the effective range set by said effective range setting means;
   attack instruction means for giving attack instructions to said first character; and
   attack result control means for causing the said first character to attack said second character with the item in accordance with the instructions from said attack instruction means.

2. The video game device according to claim 1, wherein said three-dimensional image processing means causes the display device to display the three-dimensional reference range, corresponding to the effective range set by said effective range setting means, in a form of a polyhedron defined by a wire frame in a virtual space.

3. The video game device according to claim 2, wherein, of polygons defining the wire frame, said three-dimensional image processing means draws sides of a foreground polygon in order that said sides will not overlap with sides of adjacent polygons, and draws a ground based side of a background polygon.

4. The video game device according to claim 1, wherein said three-dimensional image processing means causes the display device to display said three-dimensional reference range, corresponding to the effective range set by said effective range setting means, in a substantially spherical form.

5. The video game device according to claim 1, wherein said three-dimensional image processing means causes the display device to display said three-dimensional reference range while gradually expanding said reference range.

6. The video game device according to claim 1, wherein said reference point is a position of said first character.

7. The video game device according to claim 1, wherein:
   said item is a weapon to hit an enemy; and
   said attack result control means control a result of the attack so that a chance of hitting said second character in a case where said second character is located in said reference range will be higher than in a case where said second character is out of said reference range.

8. The video game device according to claim 1, wherein:
   said item is a weapon to hit an enemy; and
   said attack result control means control a result of the attack so that the attack on said second character inside the reference range will damage said second character more seriously than an attack on said second character outside of the reference range.

9. The video game device according to claim 1, wherein:
   said video game device further comprises selection means for selecting an arbitrary item from a plurality of items; and
   said effective range setting means sets the effective range of the item selected by said selection means.

10. The video game device according to claim 9, wherein:
    said video game device further comprises storage means for storing effective ranges which have been predetermined one for each of said plurality of items; and
    said effective range setting means sets an effective range of a size according to the effective range of the item selected by said selection means.

11. A video game device comprising:
    an input device for inputting instructions; and
    a processing circuit for executing a game program for a game in which items are prepared, in accordance with the instructions input from said input device, and for executing the game in accordance with the instructions input from said input device and outputting an image signal representing images used in the game;
    wherein the item is designated in accordance with the input instruction from said input device, and
    said processing circuit sets a three-dimensional reference range corresponding to an effective range of the designated item and outputs, to a display device, an image signal representing the set three-dimensional reference range to be displayed on the display device.

12. The video game device according to claim 11, wherein said processing circuit displays the set three-dimensional reference range in a form of a polyhedron defined by a wire frame.

13. The video game device according to claim 12, wherein, of polygons defining the wire frame, said processing circuit draws sides of a foreground polygon in order that said sides will not overlap with sides of adjacent polygons, and draws a ground based side of a background polygon.

14. The video game device according to claim 11 wherein said processing circuit causes the display device to display the set three-dimensional reference range in a substantially spherical form.

15. The video game device according to claim 11, wherein said processing circuit causes the display device to display an image represen ting said three-dimensional reference range while gradually expanding the image.

16. A video game method for advancing a video game using a plurality of items, comprising:
    a setting step of setting an effective range of each of said plurality of items;
    an attaining step of attaining a three-dimensional reference range corresponding to the effective range set by said setting step, the attained reference range having its center at a reference point; and
    a display step of displaying the attained three-dimensional reference range in a virtual space.

17. The video game method according to claim 16, wherein said display step displays the attained three-dimensional reference range in a form of a polyhedron defined by a wire frame.

18. The video game method according to claim 17, wherein said display step displays the attained three-dimensional reference range in a substantially spherical form.

19. A computer program product including a computer usable recording medium having a computer readable program recorded for causing a computer to execute a video game in which a plurality of items are prepared, said program executing:
    a setting step of setting an effective range of each of said plurality of items;
    an attaining step of attaining a three-dimensional reference range corresponding to the effective range set by said setting step, the attained reference range having its center at a reference point; and a display step of displaying the attained three-dimensional reference range in a virtual space.

20. A computer data signal embodied in a carrier wave for causing a computer to serve as a video game device that executes a video game in which a plurality of items are prepared, said computer data signal comprising:

a setting program for setting an effective range of each of said plurality of items;

an attaining program for attaining a three-dimensional reference range corresponding to the effective range set by said setting program, the attained reference range having its center at a reference point; and a display program for causing a display device to display the attained three-dimensional reference range.

* * * * *